United States Patent [19]

Hirai

[11] 4,203,514
[45] May 20, 1980

[54] APPARATUS FOR FEEDING WORKPIECES INTERMITTENTLY

[75] Inventor: Mitsuru Hirai, Kurobe, Japan

[73] Assignee: Yoshida Kogyo K. K., Tokyo, Japan

[21] Appl. No.: 846,364

[22] Filed: Oct. 28, 1977

[30] Foreign Application Priority Data

Oct. 30, 1976 [JP] Japan ................. 51-130919

[51] Int. Cl.² ............................................. B65G 47/90
[52] U.S. Cl. ................... 198/774; 414/222; 414/677; 414/750
[58] Field of Search .................. 214/1 R, 1 BB, 1 BT, 214/1 F, 1 P; 198/339, 750, 772, 774, 777; 414/222, 750, 677

[56] References Cited

U.S. PATENT DOCUMENTS

| | | | |
|---|---|---|---|
| 863,842 | 8/1907 | George | 198/774 |
| 3,842,990 | 10/1974 | Posselt | 214/1BB |
| 4,089,203 | 5/1978 | Wallis | 214/1 BB |

FOREIGN PATENT DOCUMENTS

| | | | |
|---|---|---|---|
| 2456403 | 8/1976 | Fed. Rep. of Germany | 214/1 BB |
| 349920 | 12/1960 | Switzerland | 198/740 |

*Primary Examiner*—Frank E. Werner
*Attorney, Agent, or Firm*—Hill, Van Santen, Steadman, Chiara & Simpson

[57] ABSTRACT

An apparatus for feeding elongate workpieces intermittently sideways one by one to successively located machining and parts-assembling stations includes a pair of parallel spaced feed rods supported on a transfer table and extending in a direction in which the workpieces are transferred. Each of the feed rods has a plurality of workpiece holders spaced therealong at an interval that corresponds to a distance at which the processing stations are spaced. The feed rods are movable axially back and forth by a drive mechanism for a stroke corresponding to the above-mentioned interval. The feed rods are supported at their ends in bearing units and rotatable by gearing in the bearing units between a first position in which the workpiece holders hold the workpieces at a retracted position of the feed rods and a second position in which the workpiece holders release the workpieces at an advanced position of the feed rods. Devices are provided on the table for supporting the workpieces after receiving them from the workpiece holders on the feed rods which are in the advanced position.

6 Claims, 16 Drawing Figures

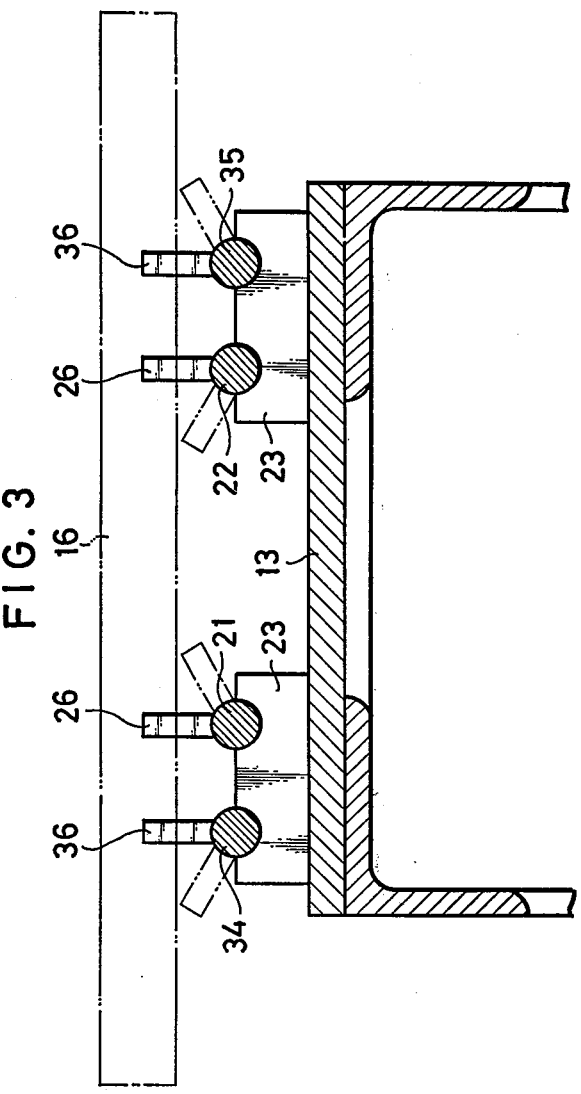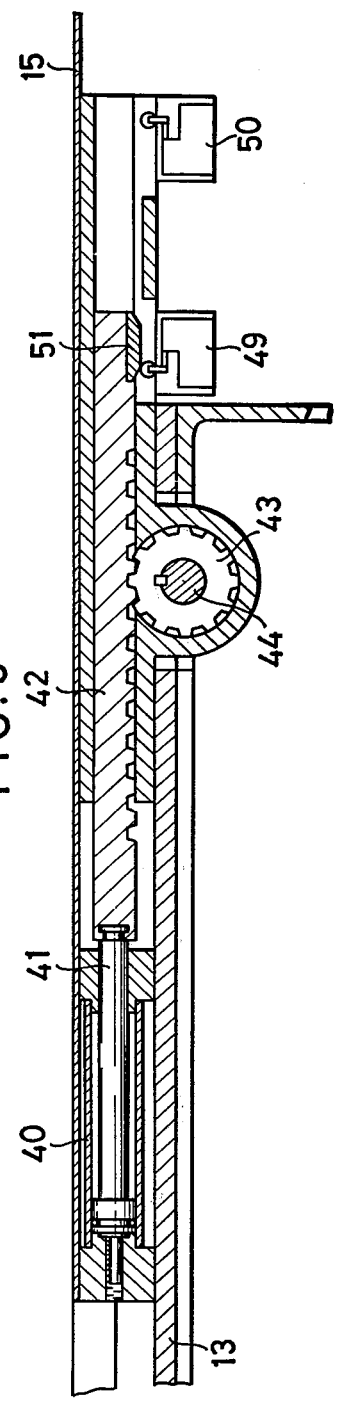

APPARATUS FOR FEEDING WORKPIECES INTERMITTENTLY

BACKGROUND OF THE INVENTION

Field of the Invention

The present invention relates to an apparatus for feeding workpieces intermittently.

SUMMARY OF THE INVENTION

According to this invention, an apparatus comprises a pair of parallel spaced feed rods supported on a table, each feed rod having a plurality of workpiece holders spaced therealong one from another at an interval. The feed rods are axially movable by first means between advanced and retracted positions for a stroke which is equal to the interval. Second means on the table can support the workpieces after receiving them from the workpiece holders on the feed rods which are in the advanced position. The feed rods are rotatably by third means about their axes between a first position in which the workpiece holders can hold the workpieces at the retracted position and a second position in which the workpiece holders can release the workpieces at the advanced position.

An object of the present invention is to provide an apparatus for feeding workpieces such as sash bars intermittently sideways one by one to stations in which their ends can be machined for assembly.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 3 is an enlarged cross-sectional view of the portion shown in FIG. 2;

FIG. 5, appearing with FIG. 3, is a cross-sectional view taken along line V—V of FIG. 4;

DESCRIPTION OF THE PREFERRED EMBODIMENTS

Figure 1:
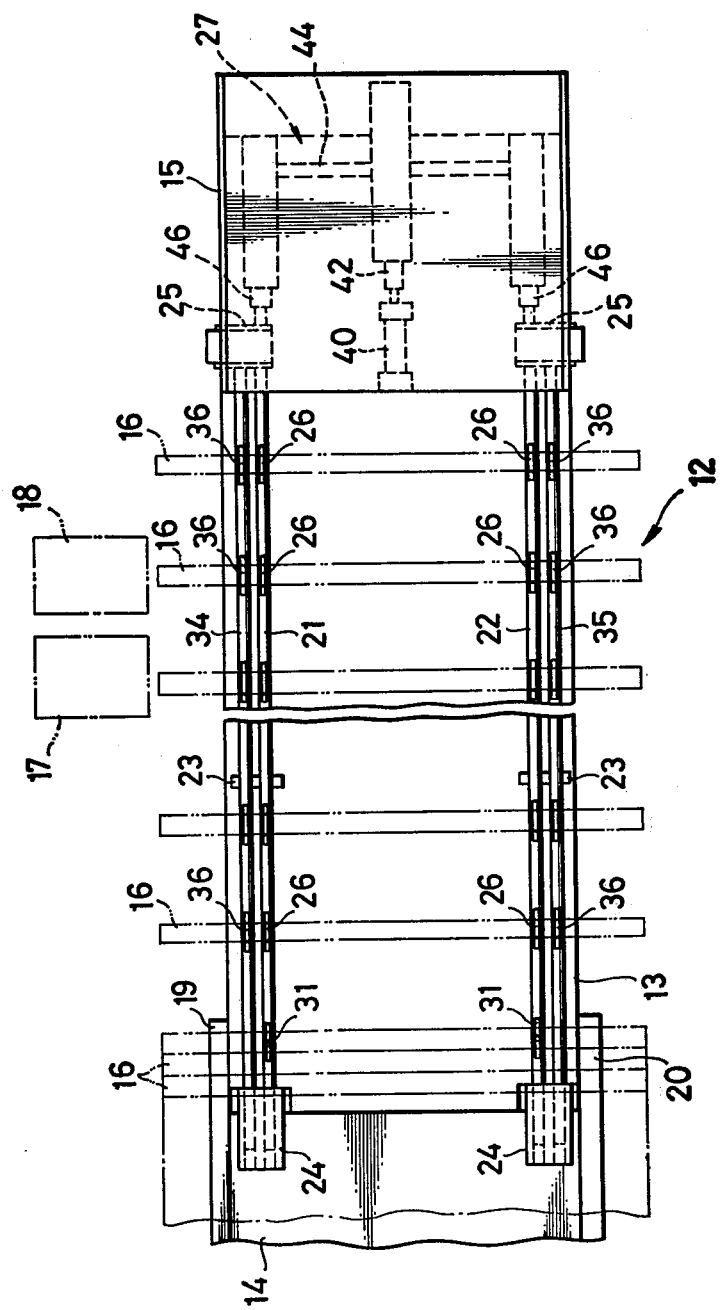
FIG. 1 is a top plan view of an apparatus constructed in accordance with the present invention.

The present invention is particularly useful when embodied in a feeding apparatus such as shown in FIG. 1 generally indicated by the numeral 12. The apparatus 12 includes an elongated transfer table 13, a workpiece loading table 14 coupled to one end of the transfer table 13, and a workpiece unloading table 15 coupled to the other end of the transfer table 13. A plurality of elongate workpieces 16 such as sash bars are placed successively on the loading table 14 and fed intermittently sideways one by one over the transfer table 13 to a series of stations where various machine tools as indicated by the numerals 17,18 are provided alongside of the transfer table 13, the machine tools working on the workpieces 16 for cutting their ends, attaching necessary parts, or performing other machining operations thereon. The workpiece loading table 14 includes a pair of supply arms 19,20 extending over the transfer table 13 toward the workpiece unloading table 15.

A pair of parallel feed rods 21,22 extend in a direction in which the workpieces 16 are to be transferred, and are slidably supported on a pair of supports 23 on the transfer table 13 and spaced laterally a distance from each other, which distance is shorter than individual workpieces 16 to carry them jointly thereon. Each of the feed rods 21,22 has both ends supported respectively in bearing units 24,25 for axial movement and for rotation about its own axis. Each feed rod has thereon a plurality of workpiece holders 26 spaced therealong one from another at an interval which is equal to an interval at which the adjacent machine tools 17,18 are functionally spaced apart from each other. Under the workpiece unloading table 15, there is a drive mechanism 27 that enables the feed rods 21,22 to move in unison axially between advanced and retracted positions for a stroke which is equal to the interval at which the workpiece holders 26 are spaced one from another. The workpiece holders 26 on one of the feed rods 21 are held respectively in transverse alignment with the workpiece holders 26 on the other feed rod 22 at all times while the feed rods 21,22 reciprocate together.

Figure 2:
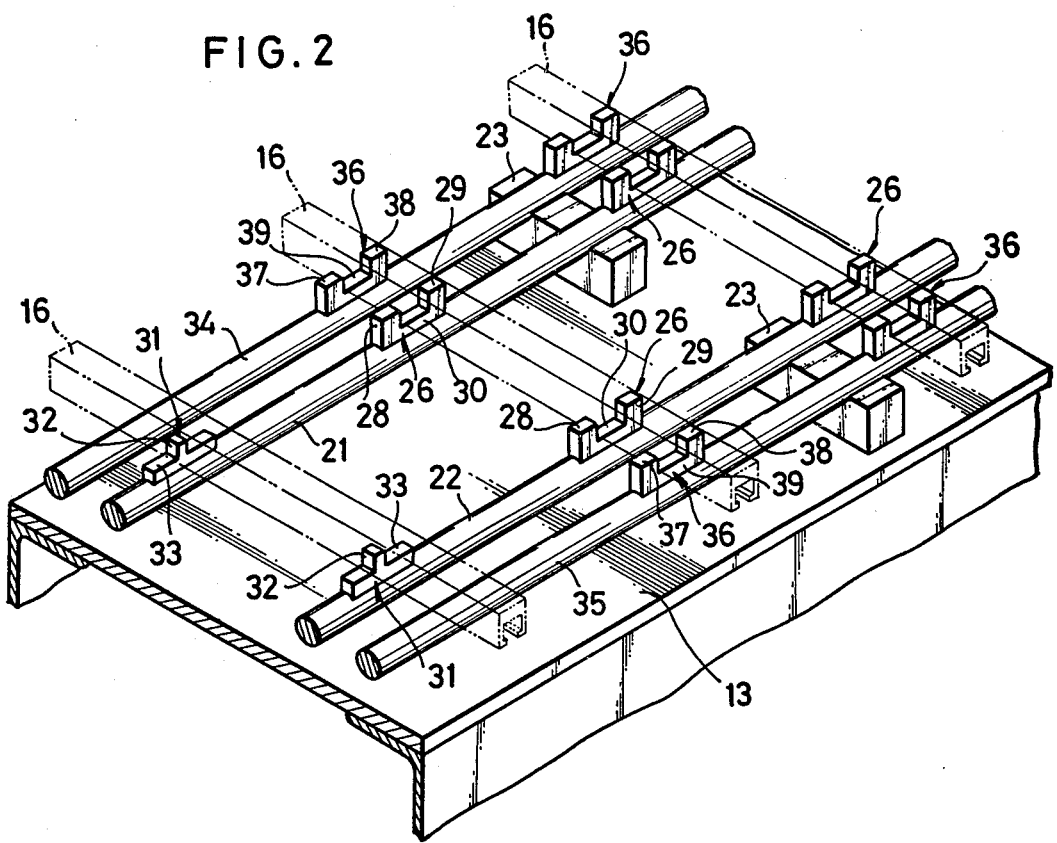
FIG. 2 is an enlarged fragmentary perspective view of a portion of the apparatus shown in FIG. 1.
Figure 7:
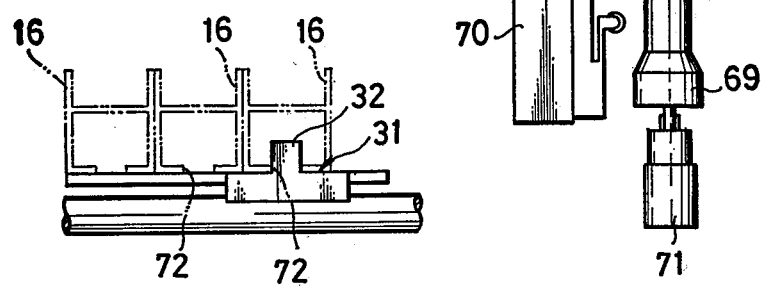
FIG. 7 is a front elevational view illustrating a workpiece catching member.

As shown in FIG. 2, each workpiece holders 26 includes a pair of spaced arms 28,29 extending from a base 30 fixed to the feed rod, the arms 28,29 being receptive of each workpiece 16 therebetween. As shown in FIG. 1, 2 and 7, each of the feed rods 21,22 has a workpiece catching member 31 at one end thereof near the bearing unit 24, the workpiece catching member 31 including a projection 32 extending from a base 33 secured to the feed rod 21,22. The projections 32 of the workpiece catching members 31 enter a slot in and engage the workpieces 16 one at a time to pull the workpiece 16 from the loading table 14 onto the transfer table 13.

As shown in FIGS. 1 and 2, a pair of parallel support rods 34,35 extend in the workpiece transferring direction, and are supported on the supports 23 and spaced laterally apart from each other to carry the individual workpieces 16 jointly thereon, the support rods 34,35 extending adjacent to and parallel to the feed rods 21,22, respectively. Each of the support rods 34,35 has both ends supported respectively in the bearing units 24,25 for rotation about its own axis. Each support rod has thereon a plurality of workpiece holders 36 spaced one from another at a spaced interval therealong which is equal to the interval at which the adjacent machine tools 17,18 are functionally spaced apart from each other. The workpiece holders 36 on one of the support rods 34 are held respectively in transverse alignment with the workpiece holders 36 on the other support rod 35 and with the machine tools.

Each workpiece holder 36 on the support rods comprises a pair of spaced arms 37,38 extending from a base 39 fixed to the support rod 34,35 the arms 37,38 being receptive of each workpiece 16 therebetween.

Figure 4:
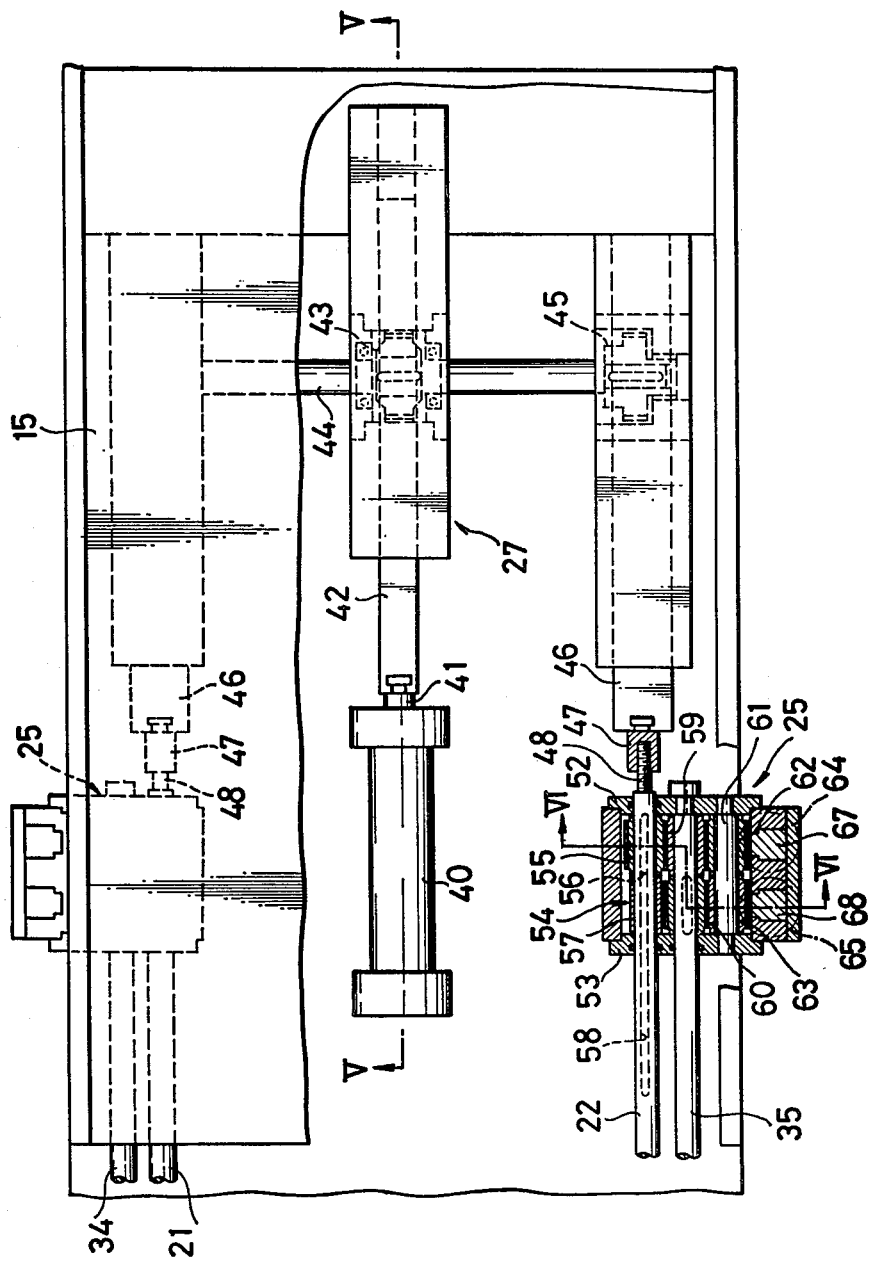
FIG. 4 is a top plan view, partly broken away and shown in cross section, of a drive mechanism employed in the apparatus of FIG. 1.

FIGS. 4 and 5 illustrate the drive mechanism 27 including a central cylinder actuator 40 with a piston rod 41 connected at its one end to a central rack 42 which is in driving mesh with a pinion 43 rotatably mounted on the workpiece unloading table 15. Fixed to the pinion 43 is a shaft 44 having its ends connected to a pair of pinions 45 (only one shown in FIG. 4) which drivingly mesh with a pair of racks 46,46 to which ends of the feed rods 21,22 that project beyond the bearing units 25,25 are coupled via a pair of nuts 47,47 each having one end connected to and rotatable relatively to the rack 46. The other ends of the nuts 47,47 threadedly receive therein a pair of externally threaded spindles 48,48 fixed coaxially to the ends of the feed rods 21,22, respectively. Fine adjustment of the position of the workpiece holders 26 on each of the feed rods 21,22 can be made by turning the nut 47 relatively to the threaded spindle 48 so as to move the feed rod axially toward or away from the rack 46. The cylinder actuator 40 is actuatable by a control unit (not shown), energization of which is controlled by a pair of limit switches 49,50 (FIG. 5) that can be activated by engagement with a land 51 on the central rack 42. Thus, the central rack 42 is restricted in its movement between advanced and retracted positions.

When the cylinder actuator 40 is actuated to move the piston rod 41 from the position of FIG. 4, the central rack 42 is moved from the retracted to the advanced position, thereby enabling the racks 46,46 to pull the feed rods 21,22 from their retracted position shown in FIG. 1 to the advanced position, the distance between the retracted and advanced positions of the feed rods 21,22 being the same as the interval between adjacent machine tools 17,18, or between adjacent workpiece holders 26 on the feed rods 21,22.

The bearing units 25,25 shown in FIG. 4 are a mirror image of each other, and one of them which is shown in cross section includes a pair of spaced bearing walls 52,53 mounted on the table 13, through which extend the end portions of the feed rod 22 and the support rod 35, both rods being journaled for rotation about their axes. The bearing unit 25 contains a set of gearing 54 including a gear 55 disposed around the feed rod 22, the gear 55 being fixed by means of a key 56 for corotation with the feed rod 22. A spacer sleeve 57 is disposed around the feed rod 22, the gear 55 and the sleeve 57 extending between the bearing walls 52,53. The feed rod 22 has an elongate keyway 58 which is substantially equal in length to the transfer interval of the workpieces 16, the keyway 58 allowing the feed rod 22 to move axially with respect to the gear 55.

A pair of gears 59,60 are provided around the support rod 35 and extend between the bearing walls 52,53. The gear 59 is an idler gear mounted for rotation on the support rod 35 and meshes drivingly with the gear 55 on the feed rod 22, and the gear 60 is keyed to the support rod 35 for corotation therewith, the gear 60 corresponding in position to the spacer sleeve 57 on the feed rod 22 and being held out of driving mesh with the gear 55. Supported between the bearing walls 52,53 is a shaft 61 extending parallel to the rods 22,35 and supporting thereon a pair of idler gears 62,63 for rotation therearound. The idler gears 62,63 are held in driving mesh with the gears 59,60, respectively, on the support rod 35.

Figure 6:
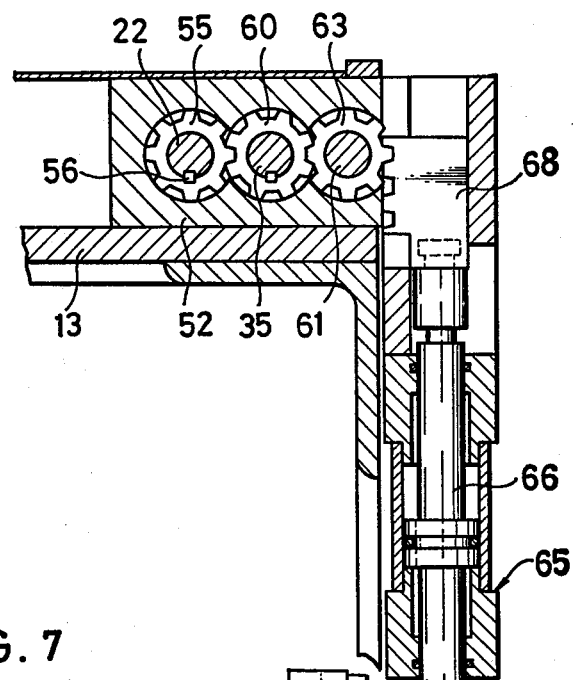
FIG. 6 is a cross-sectional view taken along line VI—VI of FIG. 4.

A pair of cylinder actuators 64,65 mounted on the transfer table 13 have a pair of piston rods respectively, one of which is shown in FIG. 6 at 66, to which are secured a pair of racks 67,68 meshing drivingly with the idler gears 62,63, respectively.

As shown in FIG. 6, one end of the piston rod 66 which is remote from the rack 68 extends downwardly beyond the cylinder and has a large-diameter portion 69 which is engageable with a pair of limit switches 70,71 for controlling the actuation of the cylinder actuator 65. The other cylinder actuator 64 is also controlled by similar limit switches (not shown).

When the cylinder actuator 64 is energized to move its piston rod from its retracted position (corresponding to the position of FIG. 6), the rack 67 is moved upwardly and causes the gear 55 on the feed rod 22 to rotate through a meshing train of the idler gears 59 and 62, the support rod 35 being not rotated. Rotation of the gear 55 causes the feed rod 22 to rotate about its own axis. When the other cylinder actuator 65 is actuated, the rack 68 enables the idler gear 63 to rotate, thereby rotating the gear 60 and hence the support rod 35 about its own axis. The direction of rotation of the support rod 35 is opposite to that of the feed rod 22 and, upon arrival of each of the racks 67,68 at its upper limit that is governed by the limit switches 70, each of the workpiece holders 26,36 on the feed rod 22 and the support rod 35 is pivoted down to a position in which it releases the workpiece 16, as illustrated in broken lines in FIG. 3.

Figure 8A:
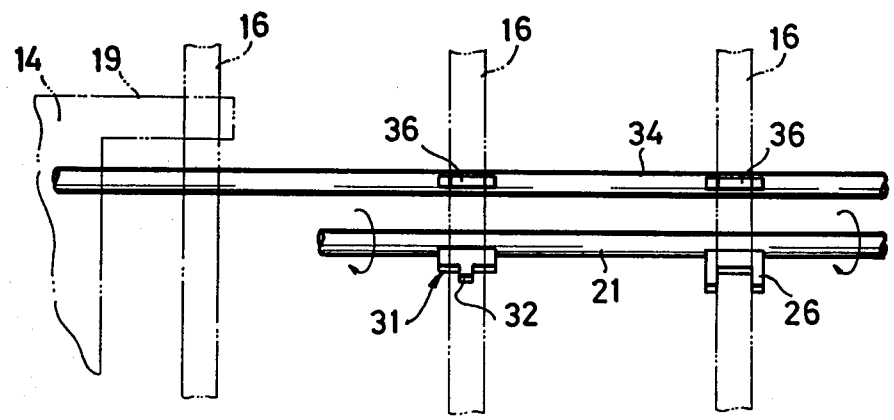
FIGS. 8A through 8F show sequential operation of feed and support rods in the apparatus.
Figure 8B:
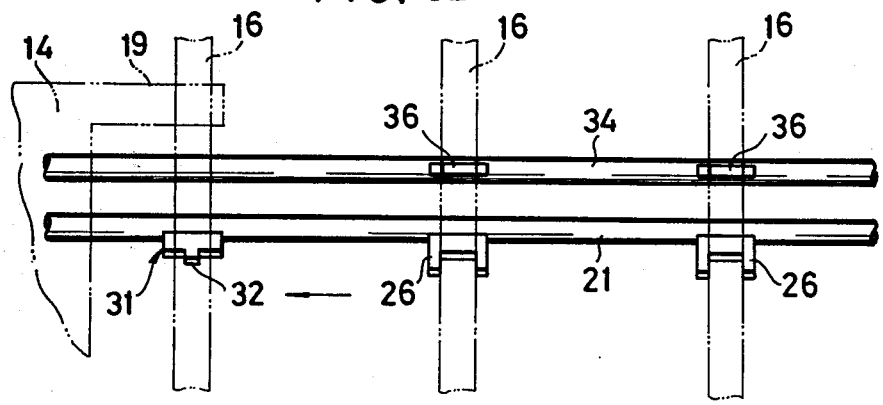

Operation of the apparatus is described with reference to FIGS. 8A through 8F in which only the feed rod 21 and the support rod 34 are shown for clarity. The workpieces 16 placed successively on the workpiece loading table 14 are pushed sideways onto the supply arms 19,20 by means of a suitable intermittently feeding machine (not shown) which operates in timed relation to the drive mechanism 27. With the central cylinder rod 41 extended, the cylinder 64 is actuated to rotate the feed rod 21 about its axis, thereby causing the workpiece holders 26 and the workpiece catching member 31 to pivot down to a lowered position in which they release any of the workpieces 16 previously fed thereby (FIG. 8A). When movement of the rack 67 reaches its upper limit, the limit switch 70 is actuated to de-energize the cylinder 64 and energize the central cylinder 40 which then retracts its piston rod 41. The feed rod 21 with the workpiece holders 26 and the workpiece catching member 31 down moves from the advanced to the retracted position, as shown in FIG. 8B. Upon arrival of the feed rod 21 at the retracted position, the central cylinder 40 is de-energized by the limit switch 49 and the workpiece catching member 31 is located in a position just under the next workpiece 16 on the supply arms 19,20. When a timer switch (not shown) is turned off after completion of the operation of the machine tools that have acted on the workpieces 16 over the transfer table 13, the cylinder 64 is actuated to contract its piston rod, thereby rotating the feed rod 21 in the opposite direction to bring the workpiece holders 26 and the workpiece catching member 31 into a raised position in which the workpiece holders 26 hold the workpieces 16 over the transfer table 13 and the workpiece catching member 31 catches the next workpiece 16 on the supply arms 19,20; that is, the projection 32 on the workpiece catching member 31 enters a slot 72

Figure 8C:
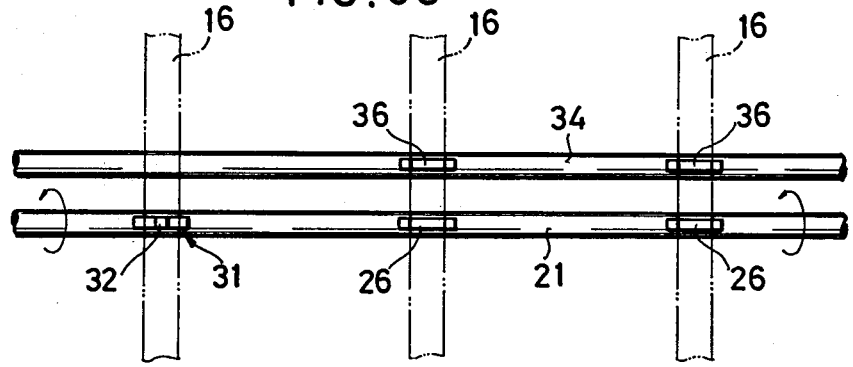

(FIG. 7) in the workpiece 16 on the supply arms 19,20 (FIG. 8C).

Figure 8D:
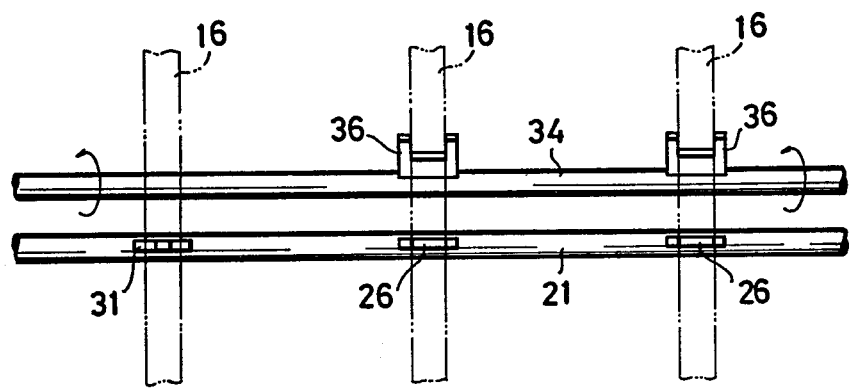
Figure 8E:
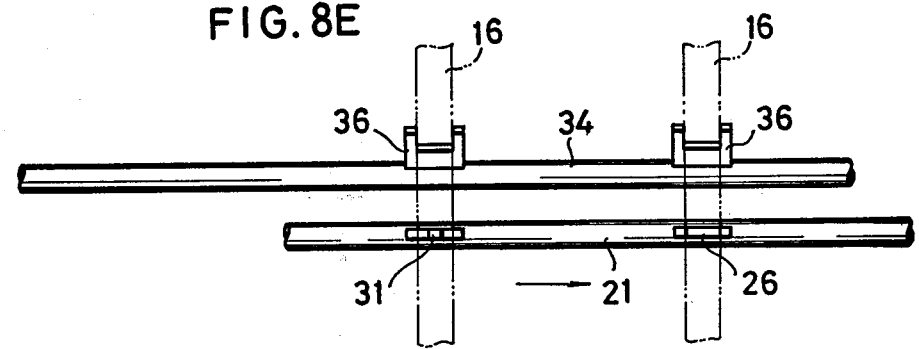
Figure 8F:
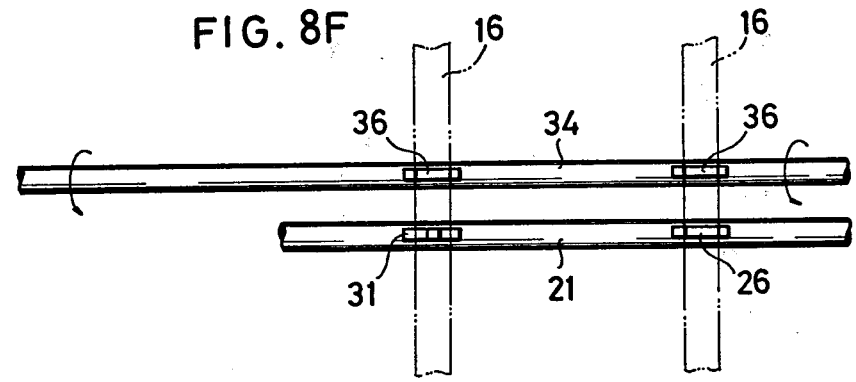

Downward movement of the piston rod of the cylinder 64 causes the limit switch 71 to be actuated, whereupon the cylinder 64 is de-energized and the cylinder 65 is energized to turn the support rod 34 about its own axis, thereby enabling its workpiece holders 36 to pivot down from a raised position in which they support the workpieces 16 to a lowered position in which they release the workpieces 16, as shown in FIG. 8D. With the upward movement of the piston rod 66 of the cylinder actuator 65, the limit switch 70 becomes actuated to bring the cylinder rod 66 to a halt and actuate the central cylinder 40, whereupon its piston rod 41 starts to extend, thereby advancing the feed rod 21 from the retracted position (FIG. 8E).

While the feed rod 21 travels to the advanced position, the workpiece catching member 31 and the workpiece holders 26 feed the workpieces 16 over the lowered workpiece holders 36 on the support rod 34 toward alignment with next processing stations along the transfer table 13 in which various machining and assembling operations are to be effected. When the feed rod 21 reaches its advanced position, the limit switch 50 is actuated to deenergize the central cylinder 40 and the cylinder 65 is actuated to rotate the support rod 34 in the opposite direction about its axis until the workpiece holders 36 thereon are pivoted from their lowered to their raised position in which they receive and hold the workpieces 16 that have been transferred sideways by the feed rod 21 for machining and parts-assembling (FIG. 8F), whereupon an entire cycle of operation is accomplished.

The entire cycle of operation is repeated to feed the workpieces 16 intermittently in sequence toward the successively located processing stations for automatic finishing of the workpieces 16.

Figure 9:
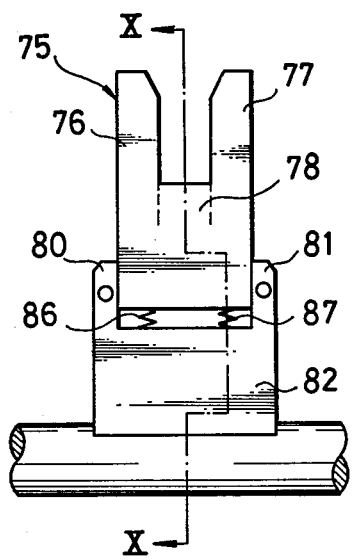
FIG. 9 is a front elevational view of a modified workpiece holder on a support rod.
Figure 10:
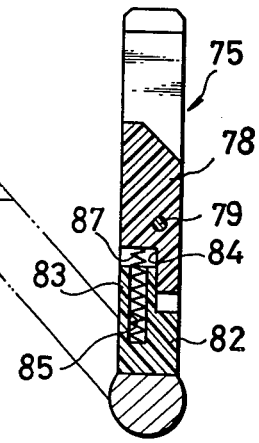
FIG. 10 is a cross-sectional view taken along line X—X of FIG. 9.

FIGS. 9 and 10 illustrate a modified workpiece holder 75 mounted on the support rod. The workpiece holder 75 comprises a pair of spaced arms 76,77 extending from a base 78 which is disposed betweeen and pivoted by pins 79 to a pair of brackets 80,81 projecting from a base plate 82 fixed to the support rod. The base plate 82 has an upward wall 83 extending into a recess 84 in the base 78, the wall 83 terminating short of the bottom of the recess 84 to leave a clearance between the top of the wall 83 and the bottom of the recess 84. Thus, the base 78 is pivotable about the pins 79 relatively to the base plate 83 between a position in which the base 78 and arms 76,77 are held in alignment with the base plate 82 as shown in solid lines in FIG. 10, and a position in which the bottom of the recess 84 in the base 78 is held against the top of the wall 83 of the base plate 82. The wall 83 has therein a pair of holes 85,85 in which are disposed a pair of compression coil springs 86,87, respectively, having their upper ends projecting beyond the top of the wall 83 and abutting against the bottom of the recess 84. The springs 86,87 normally pivotally bias the base 78 about the pins 79 in a direction to cause its recessed edge to be forcibly held against the wall 83, thereby holding the base 78 stably in alignment with the base plate 82 against wobbling movement even when the workpiece holder 75 is inclined by rotation of the support rod about its own axis.

Figure 11:
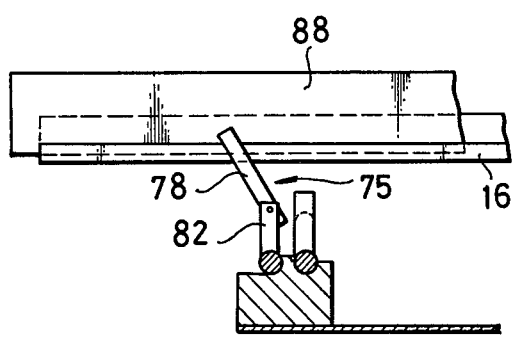
FIG. 11 is a view illustrating the way in which the modified workpiece holder of FIG. 9 acts on a workpiece.

With the modified workpiece holder 75, a workpiece can be clamped or held in position with increased stability as shown in FIG. 11 in which a workpiece 16 is held up against an overhanging member 88 of a machine tool by the spring-biased base 78 of the workpiece holder 75 which has been turned to its raised position.

As an alternative, the workpiece holders 26 on the feed rods 21,22 may have a height greater than that of the workpiece holders 36 on the support rods 34,35, the height being such that the workpiece holders 26 in the lowered position can clear the workpieces 16. With this arrangement, the support rods 34,35 are not required to be rotated about their axes for transferring the workpieces 15 over the table 13.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. An apparatus for feeding workpieces intermittently, comprising:
   (a) a table;
   (b) a pair of parallel feed rods supported on said table and spaced apart from each other to carry the workpieces jointly thereon, each of said feed rods having thereon a plurality of workpiece holders spaced therealong one from another at an interval;
   (c) first means on said table for moving said feed rods axially between advanced and retracted positions for a stroke which is equal to said interval;
   (d) a second means for supporting the workpieces after receiving same from said workpiece holders on said feed rods which are in said advanced position, said second means comprising a pair of parallel support rods supported on said table and spaced apart from each other to carry the workpieces jointly thereon, said support rods extending adjacent and parallel to said feed rods, and each of said support rods having thereon a plurality of second workpiece holders spaced therealong one from another at an interval which is equal to said first-mentioned interval;
   (e) third means for rotating said feed rods about their axes between a first position in which said workpiece holders can hold the workpieces at said retracted position and a second position in which said workpiece holders can release the workpieces at said advanced position, said third means comprising a pair of sets of gearing each including a first cylinder actuator mounted on said table and having a first piston rod, a first rack coupled to said first piston rod, a first gear mounted for rotation around one of said support rods and held in driving relation with said first rack, a second gear mounted for corotation with one of said feed rods which is adjacent to said one of said support rods, said second gear being in driving mesh with said first gear, said one of said feed rods being axially movable relatively to said second gear, a second cylinder actuator mounted on said table and having a second piston rod, a second rack coupled to said second piston rod, and a third gear mounted for corotation with said one of said support rods and being held in driving relation with said second rack; and
   (f) said support rods being rotatable about their axes by said third means between a third position in which said second workpiece holders can support the workpieces after receiving same from said first-mentioned workpiece holders at said advanced position and a fourth position in which said second workpiece holders can release the workpieces while said feed rods are moved from said retracted to said advanced position.

2. An apparatus for feeding workpieces intermittently, comprising:
(a) a table;
(b) a pair of parallel feed rods supported on said table and spaced apart from each other to carry the workpieces jointly thereon, each of said feed rods having thereon a plurality of workpiece holders spaced therealong one from another at an interval;
(c) first means on said table for moving said feed rods axially between advanced and retracted positions for a stroke which is equal to said interval;
(d) second means on said table for supporting the workpieces after receiving same from said workpiece holders on said feed rods which are in said advanced position, said second means comprising a pair of parallel support rods on said table and spaced apart from each other to carry the workpieces jointly thereon, said support rods extending adjacent and parallel to said feed rods, and each of said support rods having thereon a plurality of second workpiece holders spaced therealong one from another at an interval which is equal to said first-mentioned interval, each of said second workpiece holders including (1) a pair of spaced arms extending from the support rod and being receptive of one of the workpieces therebetween and (2) a base plate fixed to the support rod, said arms being pivotally mounted on said base, and spring means normally urging said arms into alignment with said base plate; and
(e) third means on said table for rotating said feed rods about their axes between a first position in which said workpiece holders can hold the workpieces at said retracted position and a second position in which said workpiece holders can release the workpieces at said advanced position.

3. An apparatus for feeding workpieces intermittently, comprising:
(a) a table;
(b) a pair of parallel feed rods supported on said table and spaced apart from each other to carry the workpieces jointly thereon, each of said feed rods having thereon a plurality of workpiece holders spaced therealong one from another at an interval;
(c) first means on said table for moving said feed rods axially between advanced and retracted positions for a stroke which is equal to said interval;
(d) second means including at least one rotative workpiece holder on said table for alternately (1) both restraining by lateral engagement and supporting the workpieces from below while said feed rods are being moved from said advanced to said retracted positions and (2) disengaging the lower side of the workpieces while said feed rods are being moved from said retracted to said advanced position; and
(e) third means on said table for rotating said feed rods about their axes between a first position in which said workpiece holders can engage the workpieces at said retracted feed-rod position and a second position in which said workpiece holders can disengage the workpieces at said advanced feed rod position.

4. An apparatus for feeding workpieces intermittently, comprising:
(a) a table;
(b) a pair of parallel feed rods supported on said table and spaced apart from each other to carry the workpieces jointly thereon, each of said feed rods having thereon a plurality of workpiece holders spaced therealong one from another at at an interval;
(c) first means on said table for moving said feed rods axially between advanced and retracted positions for a stroke which is equal to said interval;
(d) second means on said table for alternately (1) both restraining and supporting the workpieces while said feed rods are being moved from said advanced to said retracted positions and (2) disengaging the workpieces while said feed rods are being moved from said retracted to said advanced position, said second means comprising a pair of axially fixed parallel support rods rotatably supported on said table and spaced apart from each other to carry the workpieces jointly thereon, said support rods extending adjacent and parallel to said feed rods, and each of said support rods having thereon a plurality of second workpiece holders spaced therealong one from another at an interval which is equal to said first-mentioned interval; and
(e) third means on said table for rotating said feed rods about their axes between a first position in which said workpiece holders can engage the workpieces at said retracted feed-rod position and a second position in which said workpiece holders can disengage the workpieces at said advanced feed rod position.

5. An apparatus according to claim 4, said support rods being rotatable by said third means between (1) a third position in which said second workpiece holders can restrain and support the workpieces after receiving same from said first-mentioned workpiece holders at said advanced position and (2) a fourth position in which said second workpiece holders can disengage the workpieces while said feed rods are moved from said retracted to said advanced position.

6. An apparatus according to claim 4, each of said second workpiece holders including a pair of spaced arms extending radially from the axially fixed support rod and being receptive of one of the workpieces therebetween.

* * * * *